United States Patent
Sapper et al.

(10) Patent No.: US 8,453,980 B2
(45) Date of Patent: *Jun. 4, 2013

(54) SUPPORT APPARATUS

(75) Inventors: Richard Sapper, Milan (IT); Ronald Snyder, Macungie, PA (US)

(73) Assignee: Knoll, Inc., East Greenville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,143

(22) Filed: May 7, 2012

(65) Prior Publication Data

US 2012/0217369 A1    Aug. 30, 2012

Related U.S. Application Data

(63) Continuation of application No. 12/372,110, filed on Feb. 17, 2009.

(60) Provisional application No. 61/090,712, filed on Aug. 21, 2008.

(51) Int. Cl.
*A47F 5/00* (2006.01)
*A47F 7/00* (2006.01)
*F16M 11/00* (2006.01)
*F16M 13/00* (2006.01)

(52) U.S. Cl.
USPC ............ 248/125.7; 248/121; 248/125.1; 248/176.1; 248/917

(58) Field of Classification Search
USPC .............. 248/125.1, 121, 917, 274.1
See application file for complete search history.

(56) References Cited

U.S. PATENT DOCUMENTS

| 1,220,578 | A |   | 3/1917  | Wise |
|-----------|---|---|---------|------|
| 2,244,778 | A |   | 6/1941  | Horsley |
| 2,531,925 | A | * | 11/1950 | Taylor et al. ............... 108/147 |
| 4,250,762 | A | * | 2/1981  | Weatherby ............... 74/89.38 |
| 4,479,627 | A | * | 10/1984 | Wehner ................. 248/406.2 |
| 5,085,556 | A | * | 2/1992  | Ohtomi ................. 414/744.3 |
| 5,553,820 | A |   | 9/1996  | Karten et al. |
| 5,590,863 | A | * | 1/1997  | Sasaki ................... 248/354.3 |

(Continued)

FOREIGN PATENT DOCUMENTS

| EP | 1 139 003 | 10/2001 |
|----|-----------|---------|
| GB | 2 360 894 | 3/2000  |

(Continued)

OTHER PUBLICATIONS

Herman Miller website materials showing products sold under the Herman Miller trade name, date of publication unknown but prior to filing of the patent application.

(Continued)

*Primary Examiner* — Amy J Sterling
(74) *Attorney, Agent, or Firm* — Buchanan Ingersoll & Rooney PC

(57) ABSTRACT

A support apparatus includes a support member having at least one thread, a collar attached to the support member that is moveable along the one or more threads of the support member and at least one arm assembly attached to or positioned on the collar. The one or more threads may include a ridge formed on the support member or a groove formed in the support member. The one or more arm assemblies are configured to hold an object such as, for example, a monitor, copy holder, liquid crystal display or light fixture.

26 Claims, 10 Drawing Sheets

U.S. PATENT DOCUMENTS

| | | |
|---|---|---|
| 5,687,939 A | 11/1997 | Moscovitch |
| 5,772,174 A | 6/1998 | Hirsch et al. |
| 5,992,809 A | 11/1999 | Sweere et al. |
| 6,343,006 B1 | 1/2002 | Moscovitch |
| 6,499,704 B2 | 12/2002 | Oddsen, Jr. |
| 6,505,988 B1 | 1/2003 | Oddsen, Jr. |
| 6,554,235 B1 | 4/2003 | Fortier |
| 6,554,238 B1 | 4/2003 | Hibberd |
| 6,679,090 B1 | 1/2004 | Finch, Jr. |
| 6,739,096 B2 | 5/2004 | Feldpausch et al. |
| 6,863,252 B2 | 3/2005 | Bosson |
| 6,905,101 B1 | 6/2005 | Dittmer |
| D518,063 S | 3/2006 | Piazza et al. |
| 7,014,157 B2 | 3/2006 | Oddsen |
| 7,048,242 B2 | 5/2006 | Oddsen, Jr. |
| 7,061,754 B2 | 6/2006 | Moscovitch |
| D537,323 S | 2/2007 | Saez |
| 7,182,301 B1 | 2/2007 | Oddsen, Jr. et al. |
| 7,246,780 B2 | 7/2007 | Oddsen, Jr. |
| 7,252,277 B2 | 8/2007 | Sweere et al. |
| 7,369,401 B1 | 5/2008 | Floersch |
| 7,389,965 B2 | 6/2008 | Oddsen, Jr. et al. |
| 7,392,969 B2 | 7/2008 | Chiu et al. |
| 2002/0011544 A1 | 1/2002 | Bosson |
| 2002/0113180 A1 | 8/2002 | Wiebe |
| 2004/0139812 A1 | 7/2004 | Erel et al. |
| 2005/0133678 A1 | 6/2005 | Dittmer |
| 2005/0284991 A1 | 12/2005 | Saez |
| 2005/0284997 A1 | 12/2005 | Tisbo et al. |
| 2006/0261228 A1 | 11/2006 | Hung |
| 2006/0266909 A1 | 11/2006 | Oddsen, Jr. et al. |
| 2008/0192418 A1 | 8/2008 | Zambelli et al. |
| 2008/0237439 A1 | 10/2008 | Oddsen |

FOREIGN PATENT DOCUMENTS

| | | |
|---|---|---|
| GB | 2 358 345 | 10/2000 |
| GB | 2 440 606 | 2/2008 |
| JP | 2001311498 | 11/2001 |
| WO | 2007/118862 | 10/2007 |
| WO | 2007/137905 | 12/2007 |
| WO | 2008/012368 | 1/2008 |
| WO | 2008/022873 | 2/2008 |
| WO | 2008/085422 | 7/2008 |
| WO | 2008/091998 | 7/2008 |
| WO | 2008/113860 | 9/2008 |

OTHER PUBLICATIONS

Steelcase website materials showing products sold under the Steelcase trade name, date of publication unknown but prior to filing of the patent application.

International Search Report and Written Opinion of the International Search Report for PCT/US2009/052622 dated Nov. 11, 2009.

\* cited by examiner

SUPPORT APPARATUS

CROSS-REFERENCE TO RELATED APPLICATIONS

The present application is a continuation application of U.S. patent application Ser. No. 12/372,110 filed on Feb. 17, 2009, which claimed priority to U.S. Provisional Patent Application Ser. No. 61/090,712, which was filed on Aug. 21, 2008.

FIELD OF INVENTION

The present invention relates to furniture or fixtures such as monitor arms and support arms that are sized and configured to support copy holders, computer monitors, liquid crystal displays and other objects.

BACKGROUND OF THE INVENTION

Support arms such as monitor supports or copy holders often include one or more arms that extend from a support post. The arm is configured to hold an object, such as a monitor. The support post is typically clamped to a support surface, such as a desk, table or partition wall. Examples of support arms and similar support apparatuses are disclosed in U.S. Pat. Nos. 7,389,965, 7,252,277, 7,246,780, 7,182,301, 7,048,242, 7,014,157, 6,905,101, 6,863,252, 6,739,096, 6,679,096, 6,554,238, 6,554,235, 6,505,988, 6,499,704, 5,992,809, 5,553,820, D518,063, and D537,323, U.S. Patent Application Publication Nos. 2005/0284997, 2005/0133678, 2005/028499, 2006/0266909, and 2008/02.37439, World Intellectual Property Publication Nos. WO 2008/091998, WO 2008/113860, WO 2008/012368, WO 2008/02287.3, WO 2007/137905 and WO 2007/118862 and United Kingdom Patent Application No. GB 2,440,606.

When using a support arm, a user typically rotates the support arm about a support post to position the support arm at a desired location for viewing Or using a computer screen or other object held by the support arm. Adjusting the vertical position of a support arm can be difficult. For instance, support arms are typically configured such that vertical adjustment of the support arm is time consuming or unable to provide fine adjustment.

For example. World Intellectual Property Publication No. WO 2008/022873 discloses a support arm that includes a support post with circumferential recesses at certain spacing intervals and a collar configured to attachment to the post at any of these recesses. A support configured for holding an object such as a monitor may be attached to the collar and supported on the post by the collar. A user may not easily reposition the collar vertically from one circumferential recess to a second circumferential recess along the collar. Due to the weight of the objects supported by the collar, a user may have to remove the support and monitor or other object attached to the collar prior to vertically moving the collar and support arm to a new location at a different recess. Removal of such objects may not be easily done since the objects can include televisions, computer monitors or other equipment that is wired or interconnected to other devices. Indeed, the adjustment of the collar and support arm to a different recess can require a specialist to provide such adjustment to ensure the object being held by the support arm is not damaged during the adjustment of the collar to a new recess.

Various support arms require springs, such as gas springs or coiled springs, to help support an object at a particular location and permit positioning adjustment of the support arm. For instance, World Intellectual Property Publication No. WO 2007/118862 discloses a support arm that requires a gas spring and a cable to support an object held by the arm in a particular position. The support arm also has a sleeve that may be slid over a cylindrical support post for attachment to the support post. The use of cables often detracts from the aesthetic effect of the support arm. The use of exposed springs or gas springs can also detract from the aesthetic effect of a support arm. Moreover, the use of springs and cables to support an object often increase the cost of fabricating such support apparatuses.

A support apparatus is needed that can permit a user to easily adjust the vertical position of an object held by the support apparatus. Preferably, the support apparatus has a wide range of design options that are not limited by a requirement for springs or cables to help support an object.

SUMMARY OF THE INVENTION

We provide a support apparatus that includes a support member that has at least one thread, a collar attached to the support member that is moveable along the one or more threads of the support member and at least one arm assembly attached to or positioned on the collar. The support member has at least one thread. The at least one arm assembly is sized and configured to hold at least one object.

The support member may be a support post or other elongated support member such as a generally cylindrical or generally rectangular post, Preferably, the support post is composed of metal or an elastomeric material. The one or more threads of the support member may be a groove that is formed in the support member that extends from one end of the support member to an opposite end of the support member. Preferably, the groove curves around the support member in a helical path.

In one embodiment of our support apparatus, the one or more arm assemblies may include a first arm assembly that has a first linkage pivotally attached to a second linkage and a third linkage that is pivotally attached to the second linkage. A mounting plate may also be attached to the third linkage.

Some embodiments of our support apparatus may include a friction adjustment mechanism attached to the one or more arm assemblies. The friction adjustment mechanism may include a plurality of friction inducing members positioned adjacent an axle defining a tilt axis to apply an amount of friction during movement of an object about the tilt axis. The friction adjustment mechanism may also include a rotatable member positioned adjacent the friction inducing members that is configured to rotate to adjust the amount of friction applied during movement of an object about the tilt axis.

Other embodiments of our support apparatus may include a friction adjustment mechanism that includes a linkage positioned between a moveable lobe and a fixed lobe. The fixed lobe may be attached to a mounting device and have a first surface that engages a first surface of the linkage. The moveable lobe may have a first surface that engages a second surface of the linkage. A rotatable member may extend through an opening formed in the moveable lobe and an opening formed in the linkage. The rotatable member may be moveable relative to the moveable lobe or the linkage. In some embodiments, the rotatable member may be a screw such RS a compression screw. The rotatable member may also extend through an opening formed in the fixed lobe and be moveable relative to the moveable lobe, the fixed lobe, or the linkage. The moveable lobe and fixed lobe may be structures that have generally polygonal or generally cylindrical shapes or may have other shapes.

In one embodiment, the support apparatus may include at least one arm assembly that has a linkage positioned between a moveable lobe and a fixed lobe, The fixed lobe may be attached to a mounting device and have a first surface that engages a first surface of the linkage. The moveable lobe can also have a first surface that engages a second surface of the linkage. A rotatable member may extend through an opening formed in the moveable lobe and an opening formed in the linkage such that movement of the rotatable member adjusts an amount of friction created from movement of the moveable lobe relative to the linkage. The rotatable member may also extend through an opening formed in the fixed lobe and be moveable relative to the moveable lobe, fixed lobe or the linkage. An axle may also extend through the opening in the fixed lobe and the opening of the linkage. The axle may have an opening sized and configured to receive the rotatable member.

Embodiments of our support apparatus can also include an arm assembly that has a mounting device attached to an arm positioned attached to the collar The mounting device can have a groove sized and configured to receive a tool such as a hex wrench or screw driver. That tool may be stored for use in adjusting the friction in a friction adjustment mechanism. For instance, the tool may be used to rotate the rotatable member of a friction adjustment mechanism.

The one or more arm assemblies of our support apparatus may include arm assemblies that are composed of multiple linkages or just one linkage. In one embodiment, the support apparatus includes an arm assembly that has a first linkage that has a first end pivotally attached to the first end of a second linkage. The first linkage also has an indented portion sized and configured to receive at least a portion of the second linkage such that the second linkage can be moved to at least one position adjacent the indented portion. Preferably, the second linkage is rotatable along an angular range of 0° to 339°. The indented portion of the first linkage may define a gap between the indented portion and the first end of the first linkage.

Some embodiments of our support apparatus include a collar that has a projection sized and configured to engage the one or more threads of the support member. The one or more projections may be sized to travel along or move along the one or more threads. For instance, the one or more projections may be a tooth or a thread configured to slide along the one or more threads of the support member.

Embodiments of our support apparatus may include a collar that has a first portion attached to a second portion. One or more projections may extend from the first portion. The first portion may be composed of metal or plastic and the second portion may be composed of elastomeric material such as rubber. Preferably, the first portion of the collar is composed of nylon and the second portion of the collar is composed of a durometer such as sanoprene.

It should be understood that embodiments of our support apparatus do not require the use of a coil spring, gas spring or cable to maintain a position of the one or more arm assemblies. While some embodiments of our support apparatus may include such springs or cables, these components are not required for the arm assemblies to stay in a particular position.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of the support apparatus are shown in the accompanying drawings and certain present preferred methods of practicing the same are also illustrated therein, in which.

DETAILED DESCRIPTION OF PRESENT PREFERRED EMBODIMENTS

Figure 1:
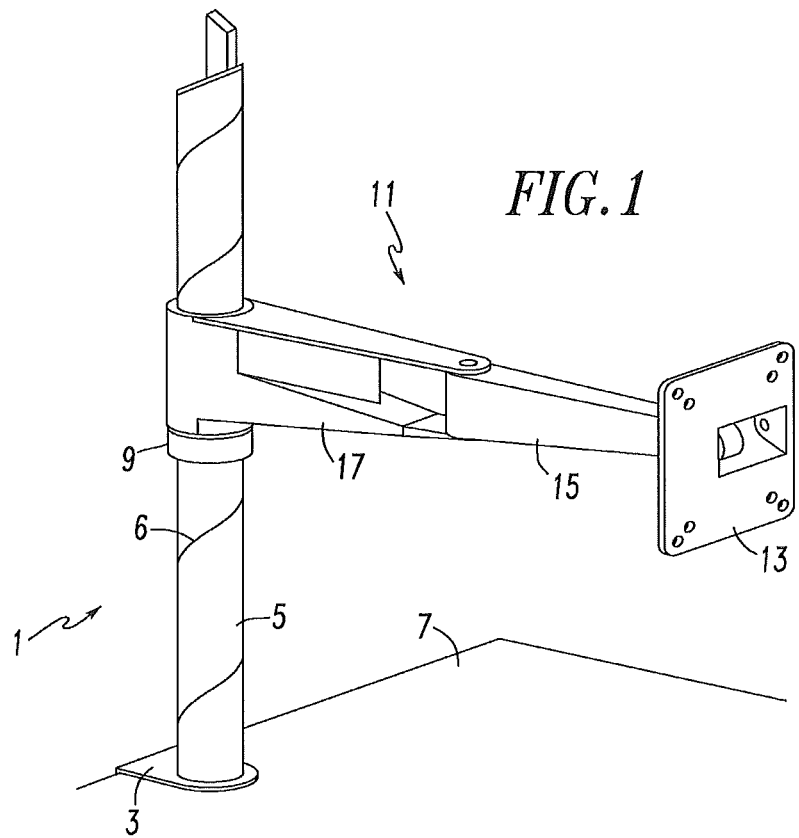
FIG. 1 is a front perspective view of a first present preferred embodiment of our support apparatus connected to a support surface in a first position.
Figure 2:
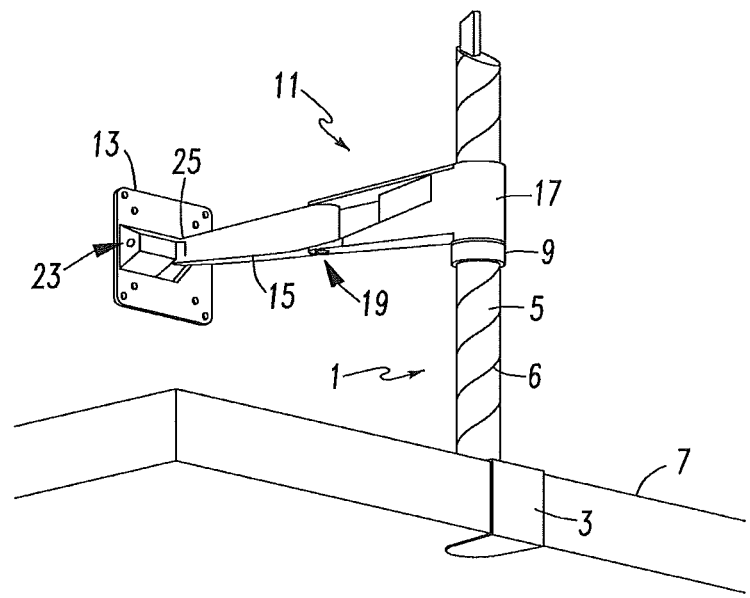
FIG. 2 is a back perspective view of the first present preferred embodiment.
Figure 3:
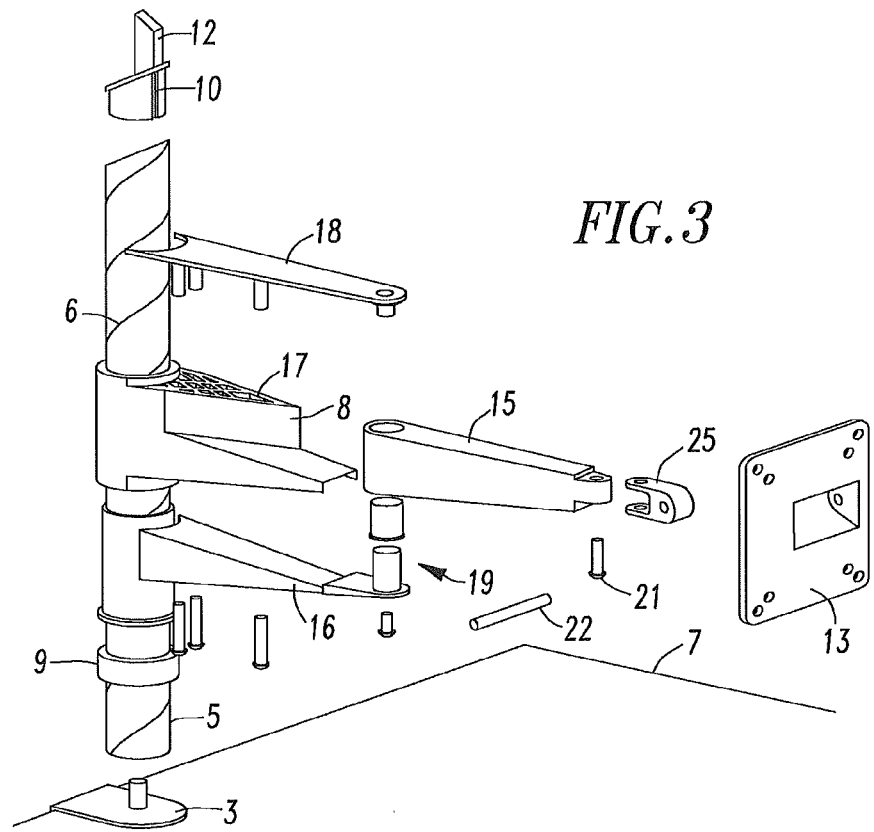
FIG. 3 is an exploded view of the first present preferred embodiment.

Referring to FIGS. 1-3, a first embodiment of our support apparatus 1 is shown mounted to a support surface 7, which may be, for example, a desk top, table top, or an article of furniture. A clamp 3 is attached to a support post 5 and is configured to attach the support post 5 to the work surface 7. A clamping member may be adjusted to connect and disconnect the clamp 3 from the work surface 7.

The support post 5 has a continuous thread 6 formed along or cut into the outer surface of the post 5. Preferably, the thread 6 extends along the outer surface of the post along a curved line path that makes multiple revolutions around the circumference of the post 5. A collar 9 is attached to the post 5 such that it is moveable along the thread 6 so the collar can be moved along at least a portion of the length of the post. The collar 9 may also be removed from the post by moving the collar along the thread 6.

A cap 10 is positioned at the top of the post. The cap 10 is configured to have a projection 12 to provide an aesthetic effect to the post. Preferably, the projection 12 of the cap 10 is configured to permit the post 5 and cap 10 to create an aesthetic effect that is at least slightly representative of a sailboat mast, as shown in FIGS. 1 and 2. Such an aesthetic effect can be provided by the unique structure of the cap 10, the length and width of the post 5 and the orientation, size and configuration of the projection 12 of the cap 10. Preferably, the projection 12 has a generally rectangular shape.

An arm 11 is disposed adjacent the support post 5 and is rotatable about the support post 5. The arm 11 is supported on the collar 9 and can rest upon the top portion of the collar 9 and/or engage the collar 9. The arm 11 is configured so a user may move arm 11 to place the arm in multiple different positions by rotation of the entire arm 11 or by movement of various portions of the arm 11. It should be understood that the portions of the arm 11 may be composed of metal, elastomeric material, composites, other materials, or a combination of such materials. The arm 11 may be configured to hold an object such as a monitor, liquid crystal display, copy holder, or light fixture.

As may best be appreciated from FIG. 3, the arm 11 includes a first link 17 that has a first end disposed adjacent the support post 5 and can rotate about the support post 5. The first link 17 has a second end that is pivotally attached to a second link 15 at a pivot assembly 19. Pivot assembly 19 defines a substantially vertical axis. The second arm link 15 may move relative to the first arm link 17 about this vertical axis.

It should be appreciated that the first arm link 17 can move independent of the second arm link 15 about the support post 5. The second arm link 15 may move independently of the first arm link 17 about the pivot assembly 19.

The second link 15 is pivotally attached to the first link 17 at one end and is pivotally attached to a third link 25 at its second end. A pivot pin 21 defines an axis of rotation for the movement of the third link 25. The pivot pin 21 is aligned substantially vertically such that the third link can move substantially horizontally relative to the second arm link 15. The third link 25 can move about the pivot pin 21 independent of the first arm link 17 and/or the second arm link 15.

The third link 25 is pivotally attached to a mounting plate 13. An attachment mechanism 23 is attached to the mounting plate. The attachment mechanism 23 includes a pivot pin 22 that is aligned substantially horizontally so that an object may be connected to the mounting plate 13 and tilt vertically about the pivot pin 22.

The first link 17 is configured to provide a desirable aesthetic effect created by a top cap 18 and a bottom cap 16 that are positioned along the top and bottom of the first link 17. The top and bottom cap may be colored different than the first link 17 to enhance the aesthetic effect of the arm 11. The first link 17 may include an indented portion 8 that is cut into, molded or otherwise formed in the body of the first link 17. Preferably, the indented portion 8 has a generally triangular shape that is spaced from the end of the first link 17 that is pivotally attached to the second link 15.

Figure 3A:
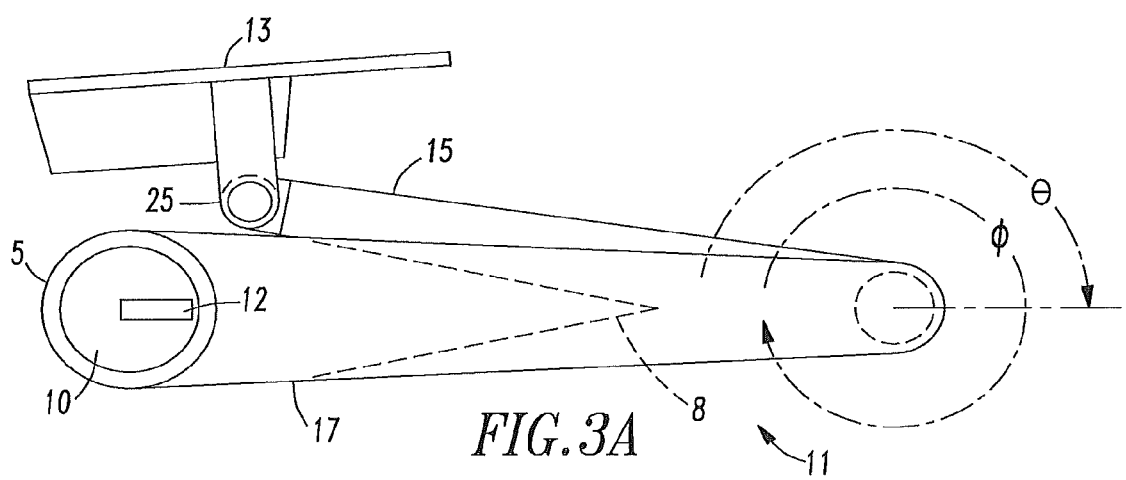
FIG. 3A is a top view of the first present preferred embodiment in a second position.

As may best be appreciated in FIG. 3A, the indented portion 8 permits the second link 15 to be rotated relative to the first link 17 by an angular range θ about one side of the first link 15 or a total angular range ϕ. Preferably, the total angular range ϕ is 339° and the side specific angular range θ is 169.5°. Most preferably, the total angular range ϕ is 3.38° and the side specific angular range θ is 169°.

The indented portion 8 is preferably formed to receive a portion of the second arm link 15 such that when the second arm link 15 is rotated from the position shown in FIG. 1 to the position shown in FIG. 3A, which is preferably a 169.5° rotation, a portion of the second arm link 15 may engage the indented portion 8 of the first arm link 17, as shown in dotted line in FIG. 3A. In other embodiments, a second arm link 15 may be disposed very close to the indented portion 8 when in this selected position, but not have any portion of the second arm link 15 actually engage the indented portion 8 when the second arm link 15 is in such a position.

It should be appreciated that the indented portion 8 can provide a substantially greater range of motion to the second arm link 15 and also permit the arm 11 to be placed in many more positions relative to the post 5. Generally, a total 360° range of rotation between the first arm link 17 and second arm link 15 is difficult, if not impossible, for arm linkages that move substantially horizontally relative to each other Such substantial horizontal movement has little, if any, vertical component to the movement. Use of indented portion 8, which also provides a space between the indented portion 8 and the pivot for the second arm link 15, permits substantially greater rotation of the second arm link 15 since the arm link may be moved very close to, if not into engagement with, the indented portion 8 of the first arm link 17.

Of course, third link 25 may rotate to move the mounting plate 13 when the arm 11 is in the first position shown in FIG. 1, the second position shown in FIG. 3A or in various other positions. The first arm link 17 may also be rotated about the post 5 when the second arm link 15, third arm link 25 or mounting plate 13 are in any position relative to the first arm link 17.

The collar 9 may be rotated to vertically adjust the position of the collar 9 on the support post. Movement of the collar 9 also adjusts the position of the arm 11. Preferably, the collar 9 is configured so that movement of the collar 9 can adjust the vertical position of the arm 11 without rotating the arm 11 or the first link 17 of the arm 11 about the support post 5. Rotation of the collar 9 in a first direction can move the collar 9 upwards. Rotation of the collar 9 in a second direction that is opposite to the first direction can move the collar downwards. The rate at which the collar may move along the post as it is rotated may depend upon the configuration of the threaded path 6. Preferably, the threaded path 6 is a thread that has a helical or spiral path that extends from the top of the support post 5 to the bottom of the support post 5. For instance, the threaded path 6 may be defined by a ridge Formed on the support post 5 or a groove formed in the support post 5 that spirals along the support post 5.

It should be appreciated that embodiments of the support post 5 that have a threaded path 6 defined along the entire length of the post permits a user to adjust the position of the arm 11 to any point along the length of the post 5. Such adjustment is relatively infinite between these two points and may not be dependent on any discrete positions located between the two ends of the thread 6.

It should also be appreciated that our support apparatus 1 can include numerous design alternatives that do not have to be limited by the use of springs or cables to maintain the positioning of the arm 11. While embodiments of our support apparatus may include springs or cables, such springs or cables are not required in the design of such embodiments so a wide array of aesthetic effects that need not be detrimentally affected by any exposed springs or cables may be contemplated. For instance, coil springs, gas springs or cables need not be utilized in embodiments of our support apparatus to maintain the position or configuration of an arm. That being said, embodiments of our support apparatus may include arms that have springs or cables if such springs or cables are desired by a designer.

Figure 4:
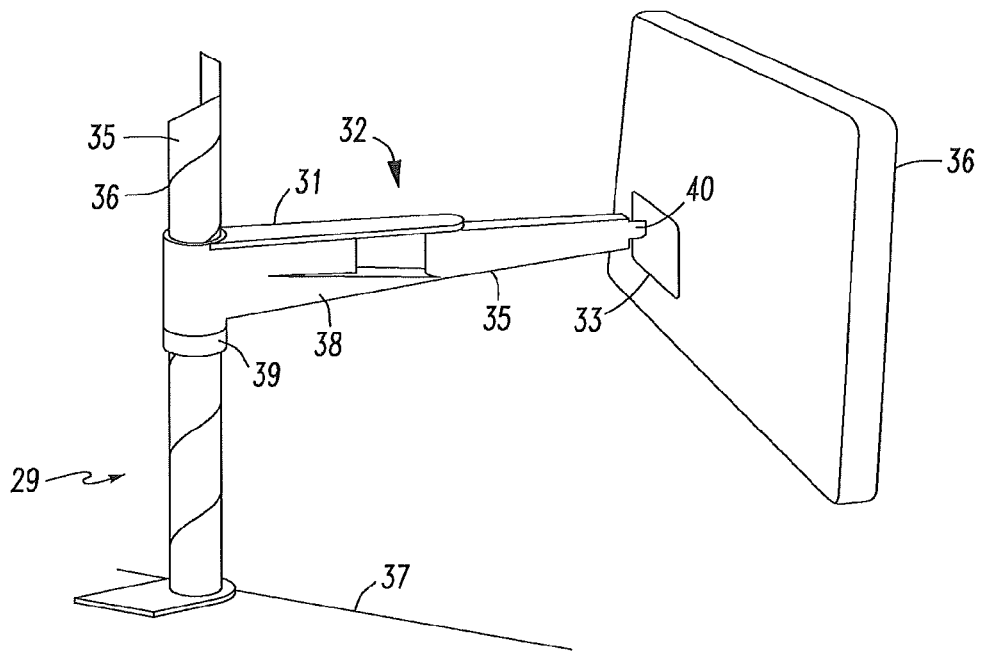
FIG. 4 is a perspective view of a second present preferred embodiment of our support apparatus.

A second present preferred embodiment of our support apparatus 29 is shown in FIG. 4. The support apparatus 29 is positioned adjacent a work surface 37 so that the support apparatus can support an object adjacent the work surface 37. The support apparatus 29 includes a support post 35 that has a thread 36 defined in the outer surface of the support post 35. A collar 39 that is moveable along the thread 36 in the support post 35, and a cap 30 is positioned adjacent the top of the post 35. An arm assembly 32 is positioned adjacent the collar 39 and support post 35 and is rotatable about the post 35.

In some embodiments, the arm assembly may include only one link. That link may be pivotally connected to a mounting plate and rotatable about the support post. In other embodiments, the arm assembly can include multiple links.

Figure 4A:
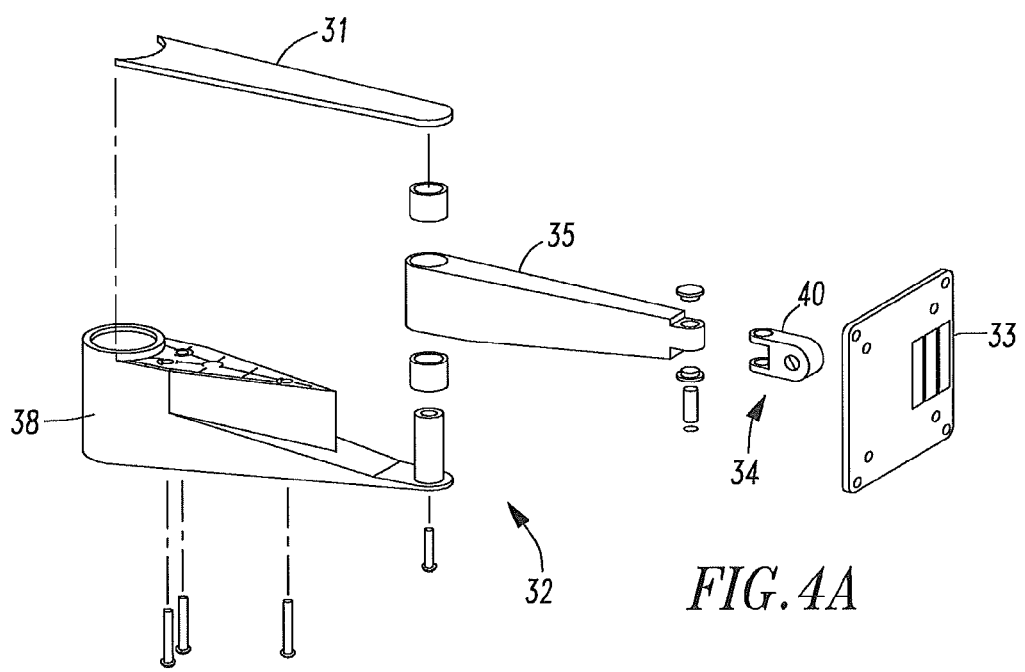
FIG. 4A is an exploded view of a present preferred embodiment of an arm assembly.

As may best be appreciated from FIG. 4A, a present preferred arm assembly 32 has a first link 38 that is a unitary structure and is pivotally connected to a second link 35. A rigid plate 31 is attached to the first link 38 to provide support to the support apparatus 29. Preferably, the rigid plate 31 is composed of metal or a plastic that is relatively rigid.

The second link 35 is also a unitary structure. A generally vertically aligned pivot pin pivotally connects the first link 38 to the second link 35 such that the second link 35 can move generally horizontally relative to the first link 38. A third link 40 is a unitary structure that is pivotally connected to the second link 35 such that the third link 40 can rotate relative to the second link 35.

A mounting plate 33 is pivotally connected to the third link 40. A pivot pin, ball and socket joint or other connection mechanism may moveably connect the mounting plate 33 to the third link 40. The mounting plate 33 is also a unitary structure. Preferably, the mounting plate 33, first link 38, second link 35 and third link 40 are all composed of plastic or metal.

The mounting plate 33 is configured to attach to an object, such as a monitor 36 or a liquid crystal display. Preferably, the mounting plate 33 or third link 40 also includes a tilt mechanism 34 that permits the mounting plate to be tilted upward or downward such that a monitor 36 attached to the mounting plate can be tilted upward or downward. For instance, the tilt mechanism 34 could include a ball and socket joint mechanism, a portion of a ball and socket joint mechanism that connects to a second portion attached to the third linkage 40, or a pivot pin. The tilt mechanism 34 may also include a friction lock that is configured to retain the tilted position of the monitor and/or mounting plate 33. For the monitor to be tilted from the first position shown in FIG. 4 to a second position, a user may manually apply a force to the monitor that overcomes the force of the friction lock in the tilt mechanism 34 to move the monitor. Preferably, the fiction lock includes an adjustment mechanism that permits adjustment of the force applied by the friction lock to hold the tilt position of the mounting plate 33 and any object attached to the mounting plate.

Figures 5, 6:
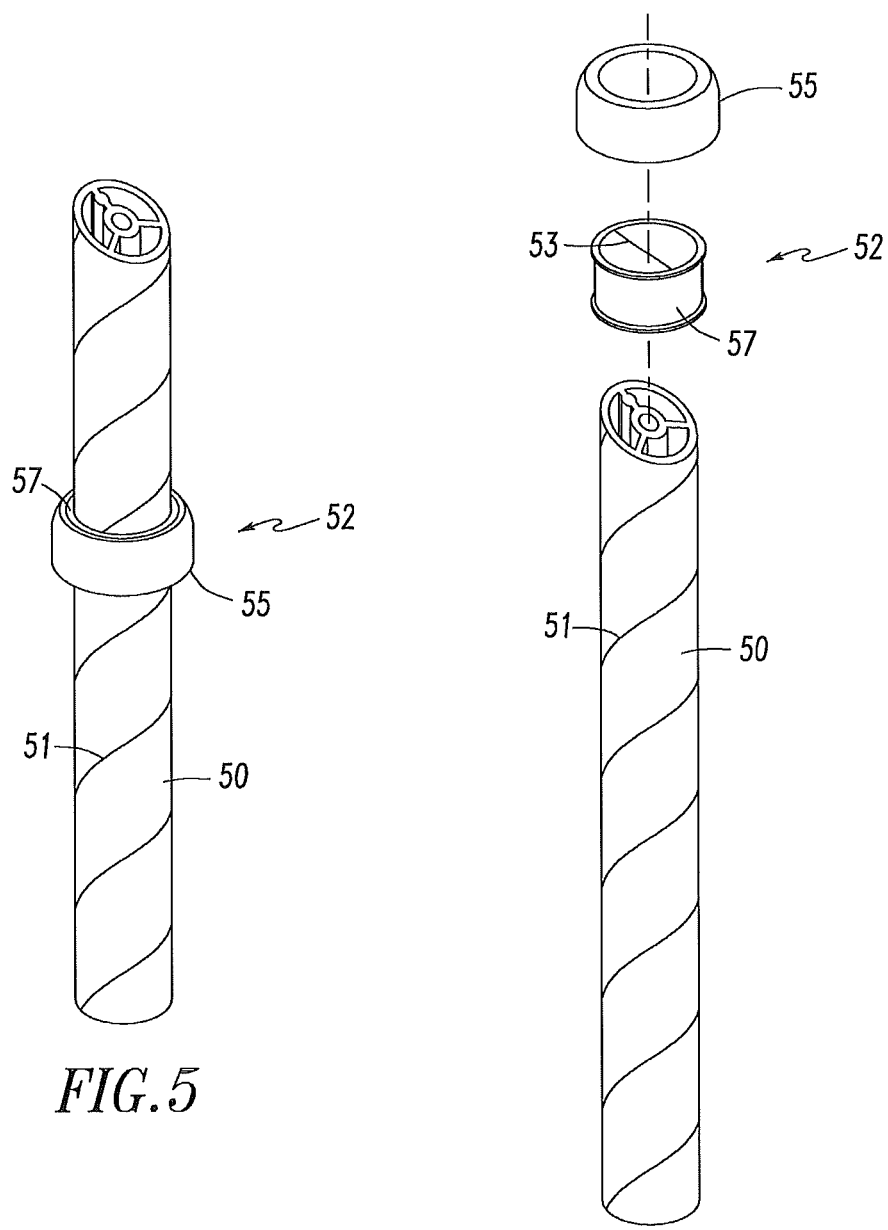
FIG. 5 is a fragmentary view of a third present preferred embodiment of our support apparatus.
FIG. 6 is an exploded view of a portion of the third present preferred embodiment.

Referring to FIGS. 5 and 6, a fourth present preferred embodiment of our support apparatus may include a collar 52 that is moveably attached to a support post 50 that has threads 51 defined in the support post 50. The collar 52 includes a first outer portion 55 and a second inner portion 57. Preferably, the outer portion 55 is composed of an elastomeric material, such as rubber or a durometer, and the inner portion 57 is composed of a relatively rigid plastic or metal. Preferably, the outer portion of the collar is configured to permit a user to easily grasp the collar to rotate the collar.

The inner portion 57 of the collar 52 has an inner surface that includes a tooth or a thread 53 that mates with the thread 51 formed in the post 50 so that rotation of the collar 52 causes the collar to move along the length of the post 50. The outer portion 55 of the collar 52 is preferably over molded to the inner portion 57 and includes a protrusion (not shown) that extends through a hole formed in the inner portion 57 such that the protrusion engages the post 50 when the collar 52 is attached to the post 50. The protrusion (not shown) is configured to provide additional friction to any movement of the collar 52 to help the collar support one or more arm assemblies or other objects.

Figure 7:
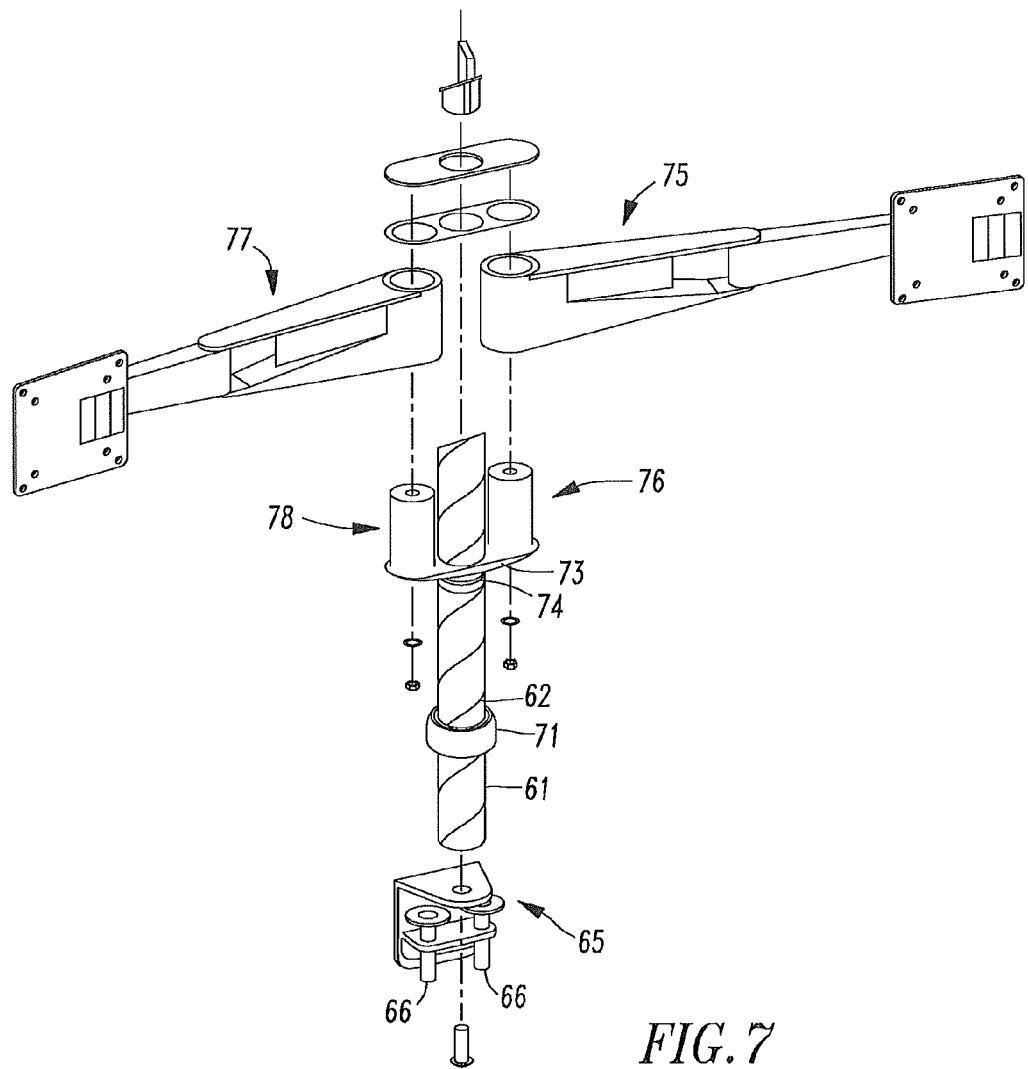
FIG. 7 is an exploded view of a fourth present preferred embodiment of our support apparatus.
Figure 7A:
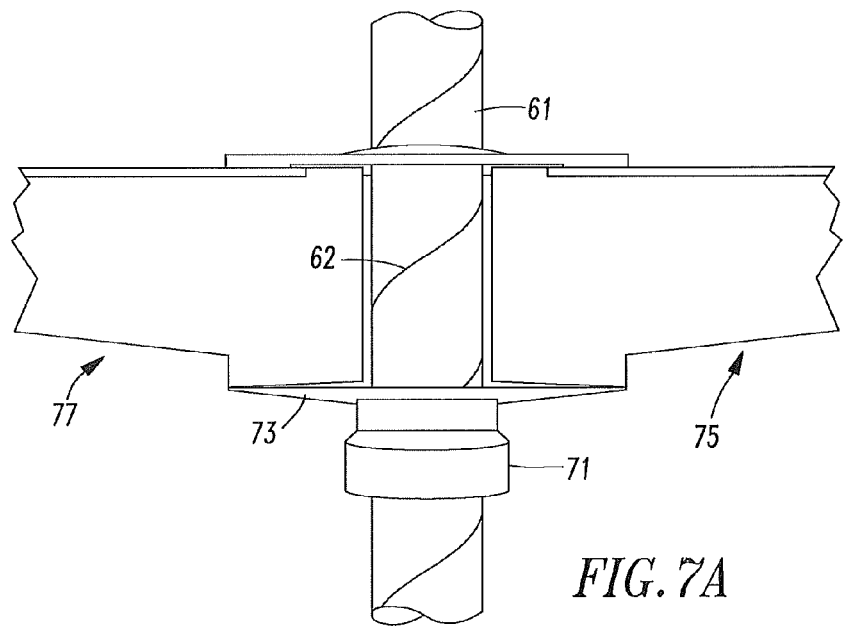
FIG. 7A is a fragmentary view of the fourth present preferred embodiment.
Figure 8:
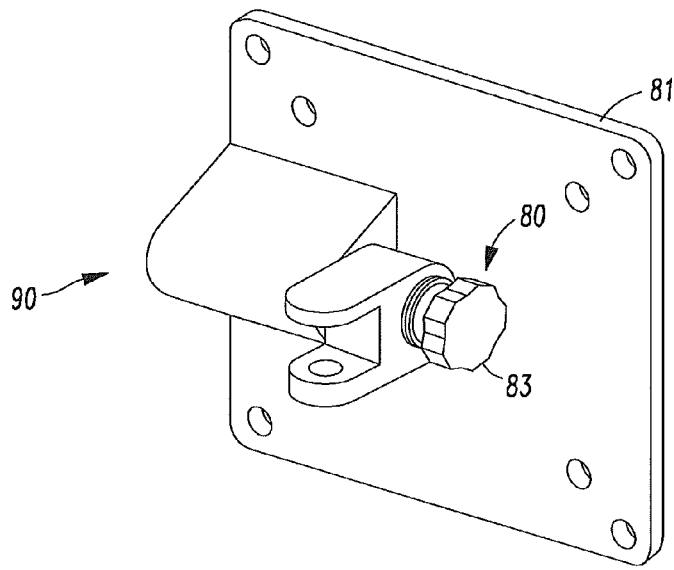
FIG. 8 is a fragmentary view of a fifth present preferred embodiment of our support apparatus.
Figure 9:
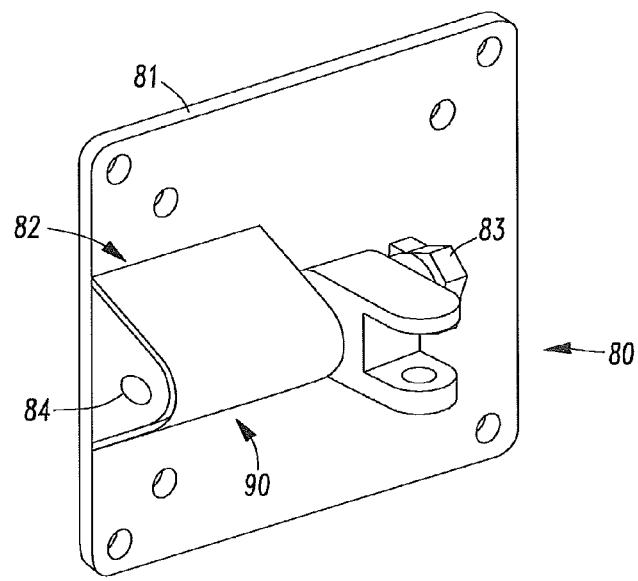
FIG. 9 is a fragmentary view of the fifth present preferred embodiment.
Figure 10:
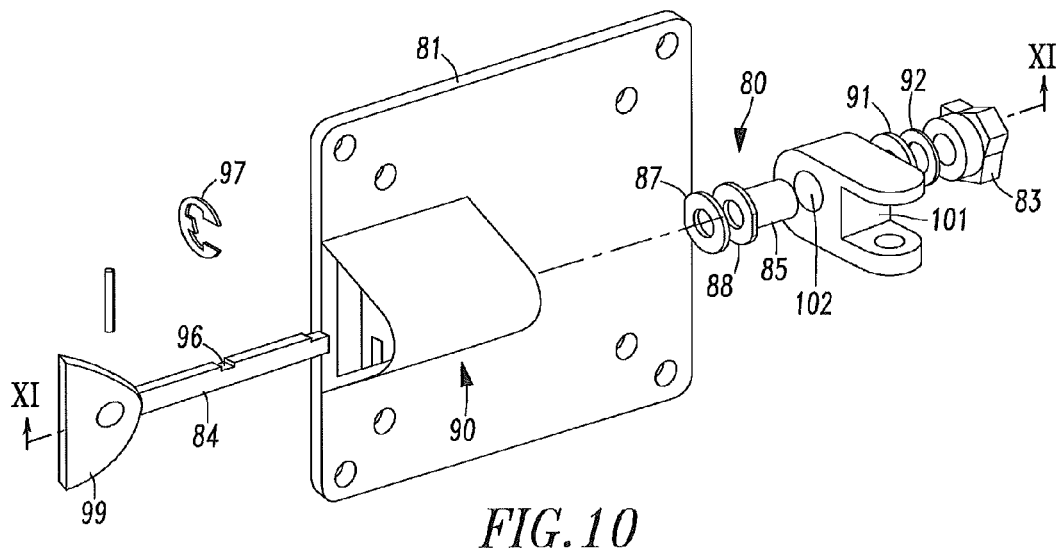
FIG. 10 is an exploded view of a first present preferred embodiment of a friction adjustment mechanism that may be included in the fifth present preferred embodiment.
Figure 11:
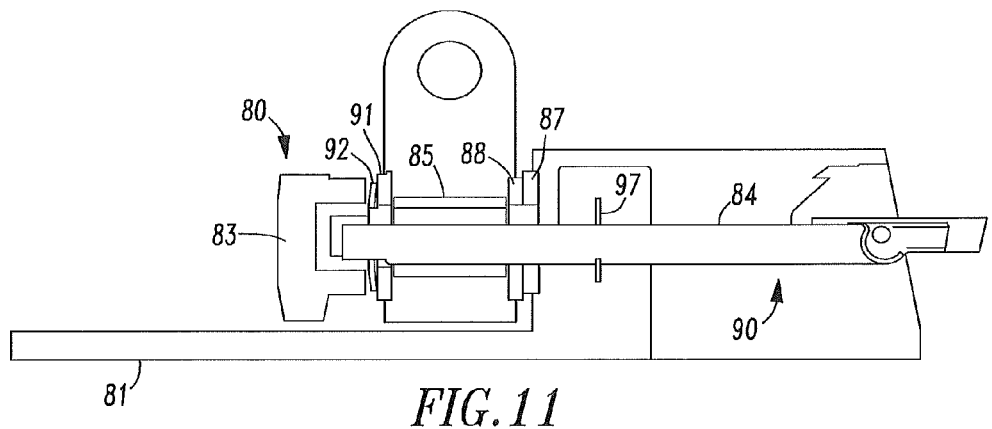
FIG. 11 is a cross sectional view of the first present preferred friction adjustment mechanism taken along line XI-XI in FIG. 10.

As shown in FIGS. 7 and 7A, embodiments of our support apparatus can be configured to support multiple objects. For example, a collar 71 can be positioned along a threaded support post 61. The collar 71 may have a tooth that fits within a grooved thread 62 such that the collar 71 can move along the thread 62 formed in the support post 61. A clamping mechanism 65 can be attached to the post 61 to attach the post 61 to a work surface or article of furniture. The clamping mechanism 65 may include one or more clamping members 66 that are moveable to attach the clamping mechanism 65 to an object or unattach the clamping mechanism 65.

A multiple arm support 73 may be disposed adjacent the support post 61 on the collar 71. Preferably, the multiple arm support 73 includes a lower portion 74 configured to rest upon the top of the collar 71 such that the lower portion 74 can rotate and/or slide along the top of the collar 71. The multiple arm support 73 can also include a first pivotal connection 76 for connecting the multiple arm support 73 to the first arm assembly 75 and a second pivotal connection 78 for connecting the second arm assembly 77 to the multiple arm support 73.

The arm assemblies 75 and 77 may be similar to arm assemblies 11 or 32 discussed above. Both arm assemblies may move independently. Movement of the collar 71 may permit vertical adjustment of the arm assemblies. Of course, movement of a particular arm linkage may also vertically and/or horizontally adjust a portion of an arm assembly.

Of course, vertical adjustment of the arm assemblies may be permitted by other portions of our support apparatus as well. For example, in one embodiment of our support apparatus, pivotal connections between different arm linkages may be configured to permit substantial vertical movement. As another example, at least one pivotal connection in an embodiment of our support apparatus could include a ball and socket joint or other connection that permits both vertical and horizontal movement of an arm linkage and/or the mounting plate of the support apparatus.

Referring to FIGS. 8-11, an embodiment of our support apparatus can include a mounting plate 81 that has a tilt mechanism 90 that includes a frictional adjustment mechanism 80 configured to adjust the friction applied during the tilting of an object, such as a monitor, light or copy holder, that is attached to the mounting plate 81. Preferably, the frictional adjustment mechanism 80 is a portion of a pivotal attachment between the mounting plate and a portion of an arm assembly.

The frictional adjustment mechanism 80 includes a housing 82 attached to the mounting plate, a pin 84 that extends through the housing 82 and an aperture 102 formed in an arm linkage 101. Interlocked washers 87 and 88 and interlocked washers 91 and 92 are adjacent the pin 84 and can act on the pin 84 such that rotation of pin 84 causes friction against the washers 87, 88, 91 and 92 to make rotation of the pin 84 require more force or less force from a user.

It is also contemplated that the housing 82 include a bearing surface adjacent the linkage 101. Linkage 101 may also be configured to have bearing surfaces adjacent each side of the aperture 102. The bearing surfaces can be molded, cut or otherwise formed into the structure of the housing 82 and/or linkage 101. It should be appreciated that such a configuration of the housing 82 and/or linkage 101 can provide a frictional adjustment mechanism that includes only one washer 92, which can reduce the cost of making certain embodiments of the frictional adjustment mechanism and/or our support apparatus.

A sleeve 85 is positioned within aperture 102 and between the washers 87 and 88 and washers 91 and 92. The sleeve 85 may also engage the pin 84 such that movement of the pin 84 creates friction between the pin 84 and sleeve 85. Preferably, the sleeve is composed of plastic or metal.

The knob 83 is configured to receive an end of the pin 84 and is able to rotate about the end of the pin. Rotation of the knob 83 in a first direction causes the washers 87 and 88 and 91 and 92 to move closer to each other such that rotation of pin 84 incurs an increased amount of friction against the washers 87, 88, 91 and 92 and/or the sleeve 85. Rotation of the knob 83 in a second direction that is opposite the first direction causes the washers and/or linkage 101 and housing 82 to move farther from each other such that rotation of pin 84 causes a decreased amount of friction against the washers 87, 88, 91 and 92 and/or the sleeve 85.

For many embodiments, the amount of friction acting on the pin 84 may be extremely high such that rotation of the knob 83 can be difficult. A lever 99 may be provided adjacent the end of the pin 84 opposite the knob 83 to release the tension within the friction adjustment mechanism so that the knob 83 may be more easily rotated. Movement of lever 99 from a first position to a second position can move the pin 84 toward the knob 83 and further into the hole in the knob sized to receive the pin 84. Such movement can relieve the tension in the friction adjustment mechanism 80 and permits rotation of the knob 83 to occur with use of much less force. Once the knob has been rotated to adjust the positions of the washers 87, 88, 91 and 92, the lever 99 may be returned to the first position to increase the tension in the friction adjustment mechanism.

It should be appreciated that movement of knob 83 can help permit a user to adjust the amount of friction so that a user may alter how much force the user must apply to the mounting plate 81 to vertically pivot the mounting plate 81 about the pin 84. A user may rotate the knob 83 in one direction to make pivoting of the mounting plate require less force and rotate the knob 83 in an opposite direction to make pivoting of the mounting plate require more force. Since different objects of different weights may be attached to the mounting plate 81, such adjustment permits the user to adjust the ease or difficulty of tilting the mounting plate 81 and the object to which it is attached, such as a monitor, to meet the user's specific preferences with respect to vertical tilting of the object attached to the mounting plate 81. Further, if one object is replaced with a lighter or heavier object, the user may adjust the friction applied to tilting of the new object to adjust for the change in weight to ensure the tilting of the new object meets with the user's preference.

The pin 84 also has a notch 96 that is sized and configured to receive a stop 97. Stop 97 is configured to prevent disconnection of pin 84 during frictional adjustment. As may be best appreciated from FIG. 11, stop 97 can engage a portion of the housing to prevent the pin 84 from being pulled out of the housing during frictional adjustment.

In some alternative embodiments, the washers 87, 88, 91 and 92 may not act directly on the pin 84. For such embodiments, rotation of the knob 83 may affect the position of the washers, which may expand or retract the sleeve 85 to adjust the amount of friction incurred during movement of the pin 84 between the sleeve 85 and the pin 84.

It is also contemplated that alternative embodiments of the tilt mechanism 90 attached to the mounting plate 81 and frictional adjustment mechanism 80 could include a ball and socket joint tilt mechanism. Such a ball and socket joint mechanism may include a frictional adjustment mechanism that acts on one or more straps to adjust the friction applied during movement of the ball portion of the socket. As another alternative, the friction adjustment mechanism may adjust the position of resilient members or frictional members located adjacent the socket portion of the ball and socket joint to adjust the amount of friction incurred during tilting of an object.

It is also contemplated that the friction adjustment mechanism could include a threaded bolt that has a knob on one end that is rotated to adjust the friction incurred from rotation of a monitor and/or the mounting plate. In an alternative design, the knob could be replaced with an adjustment mechanism such as an Allen bolt that can be adjusted with the use of a tool, such as an Allen wrench. The bolt and washers could be configured so that rotation of the Allen bolt adjusts the amount of force applied by the washers to the bolt to adjust the amount of friction incurred from movement of a monitor and/or mounting plate.

Figure 12:
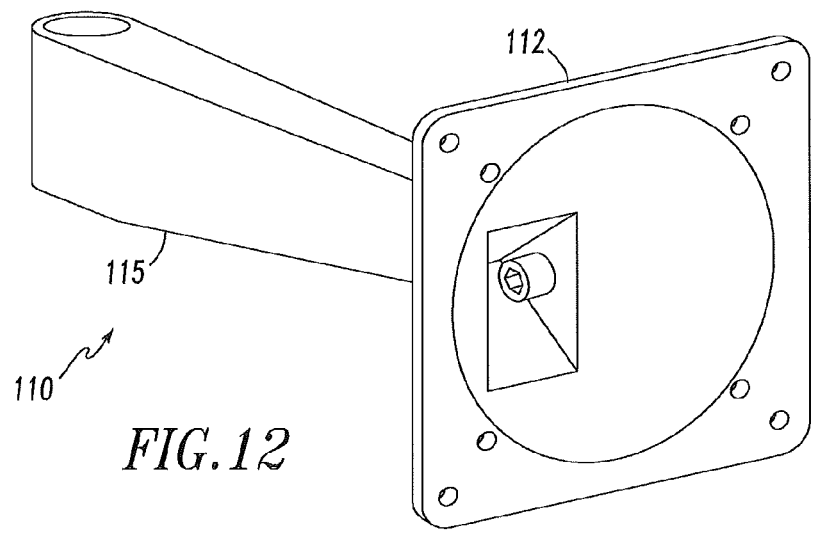
FIG. 12 is a fragmentary view of a sixth present preferred embodiment of our support apparatus.
Figure 13:
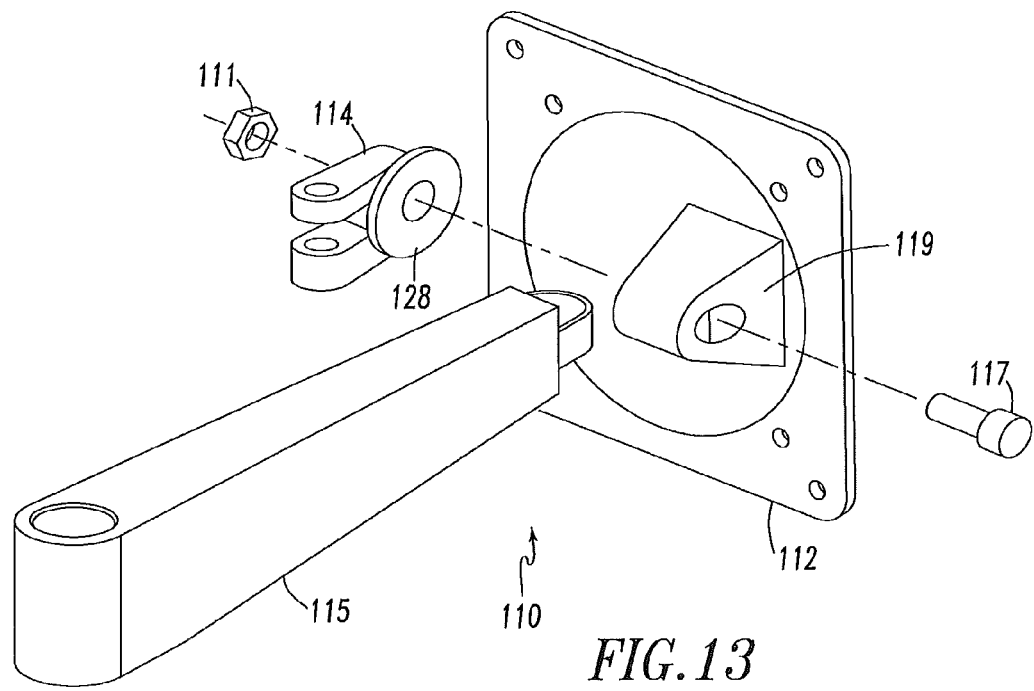
FIG. 13 is an exploded view of a portion of the sixth present preferred embodiment.
Figure 14:
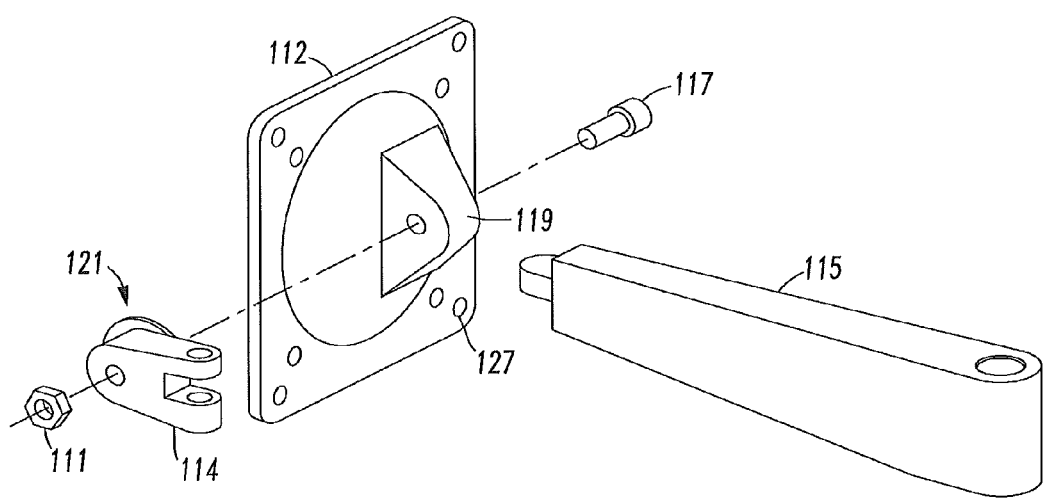
FIG. 14 is an exploded view similar to FIG. 13 of the sixth present preferred embodiment.

In a sixth present preferred embodiment, which is shown in FIGS. 12-14, an arm 110 may include a first arm member 115 that is pivotally connected to a second arm member 114. A mounting plate 112 is pivotally connected to the second arm member 114. The mounting plate 112 has a housing 119 that includes an opening sized to receive a pin 117. The second arm member 114 also has an opening sized and configured to receive the pin 117. The pin 117 is sized and configured to be inserted into the housing 119 and the second arm member 114. A nut 111 is configured to engage the pin 117 adjacent an outer side 121 of the second arm member 114. It should be appreciated that the housing 119 and the second arm member 114 include bearing surfaces 127 and 128 formed therein. The bearing surfaces 127 and 128 help permit the mounting plate 112 to rotate relative to the second aim member 114 while the second arm member 114 engages the housing 119.

The nut 111 can be threaded and configured to rotate along threads located along the surface of the pin 117 to tighten or loosen the engagement between the second arm member 114 and the housing 119. It should be appreciated that tightening the engagement between the second arm member 114 and the housing 119 requires a user to apply more force to the mounting plate 112 to move the mounting plate 112 relative to the second arm member 114. Similarly, loosening the engagement between the second arm member 114 and the housing 119 requires a user to apply less force to the mounting plate 112 to move the mounting plate relative to the second arm member 114.

In yet other embodiments, the nut 111 may be integral with the second arm member 114 and the pin 117 may be a hex screw or other pin that includes an opening sized to receive a tool such that the tool may be used to rotate the pin 117 to loosen or tighten the engagement between the second arm member 114 and the housing 119. In embodiments where the pin 117 is a hex screw, an Allen wrench or other tool may be used to adjust the friction a user must apply to move the mounting plate 112 relative to the second arm member 114.

It is also contemplated that the second arm member 114 may include a threaded opening sized to receive a threaded pin 117 and may not include a nut 111 adjacent its outer side 121. The pin 117 may include a socket or other opening sized to receive a tool. The tool, such as a headless screw or hex key, may be inserted into the socket and moved to cause the pin 117 to rotate along the threaded opening in the second arm member 114 in a first direction and in a second direction that is opposite the first direction. Rotation of the pin 117 can adjust the friction incurred by movement of the mounting plate 112 relative to the second arm member 114.

Figure 15:
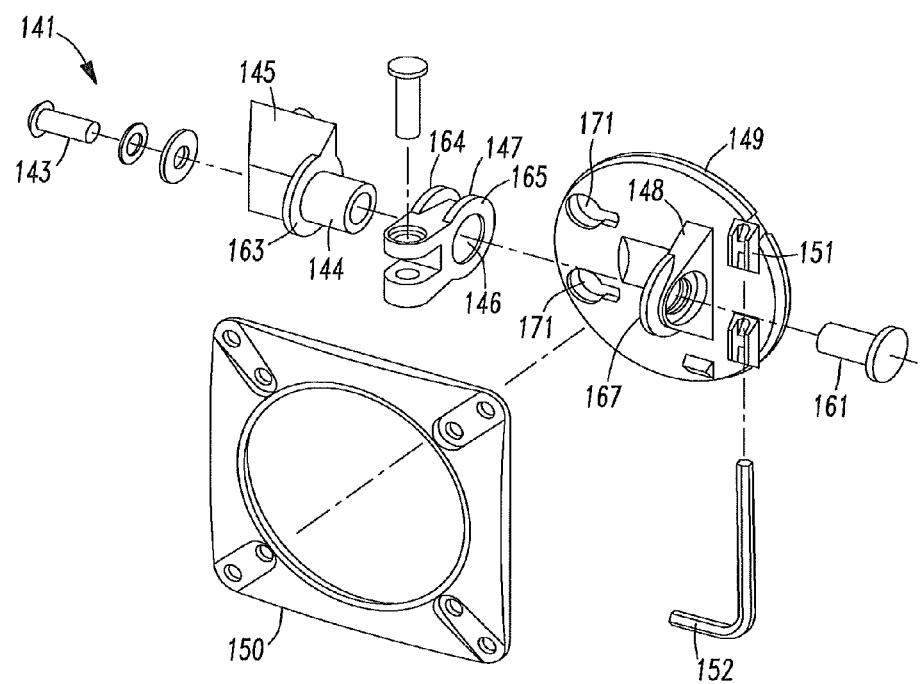
FIG. 15 is an exploded view of a second present preferred friction adjustment mechanism.

A second present preferred friction adjustment mechanism 141 that may be utilized in embodiments of our support apparatus is illustrated in FIG. 15. The friction adjustment mechanism 141 includes a linkage 147 that is between a moveable lobe 145 and a fixed lobe 148 that is attached to a disc 149. The moveable lobe 145 and fixed lobe may be generally cylindrical or generally polygonal in shape. A mounting plate 150 is moveably attached to the disc 149. It should be appreciated that the linkage 147 may be a portion of an arm that is attached to a collar around a threaded post similar to the embodiments discussed above or be a separate linkage that is attached or moveably attached to an arm or arm assembly.

It should be understood that the friction adjustment mechanism 141 can be configured to permit numerous adjustments to the position of an object held by an arm assembly. For instance, a monitor or other object mounted to the mounting plate 150 may be rotated about the disc 149 or may be vertically or horizontally tilted about different tilt axes defined by pins extending through openings formed in linkage 147.

The disc 149 is attached within an opening in a mounting plate 150 such that the mounting plate can rotate along the circumference of the disc 149. Preferably, the periphery of the disc 149 is chamfered and mates with a chamfered opening in the mounting plate 150. The mating chamfered edges of the disc 149 and mounting plate 150 may permit the mounting plate to rotate along the circumference of the disc 149 or at least partially around the periphery of the disc 149.

The fixed lobe 148 of the disc 149 is adjacent to a groove 151. The groove 151 is sized and configured to hold a tool 152, such as an Allen wrench or hex wrench. Portions of the disc 149 that define the groove also project past the circumference of the disc 149 and abut the back face of the mounting plate 150. These portions help keep the disc 149 rotatable attached to the mounting plate 150.

The fixed lobe 148 may be integral with the disc 149 or may be adhered, over molded or mechanically fastened to the disc 149. The lobe 148 defines an opening and has a tilt friction surface 167 that engages a first tilt friction surface 165 of linkage 147.

The linkage 147 has an opening 146 that is aligned with the opening in the lobe 148. The linkage 147 also has a second tilt friction surface 164 opposite the first tilt friction surface 165. The second tilt friction surface 164 is positioned adjacent a tilt friction surface 163 of the moveable lobe 145. The moveable lobe 145 has a hollow projection 164 that defines an opening that is sized and configured to receive a compression screw 143.

Preferably, the moveable lobe 145 and fixed lobe 148 is composed of an elastomeric material such as acetal, polyoxymethylene, polyacetal, polytrioxane, polyformaldehyde, and paraformaldehyde or other plastics and the linkage 147 is composed of metal, such as zinc or steel. The metal of the linkage 147 may be covered in an elastomeric material or coated in a finish. In other embodiments, the linkage 147, and lobes 145 and 148 may all be composed of metal, an elastomeric, material such as plastic, or different materials.

The compression screw 143 may be inserted into the moveable lobe 145 and extend through the moveable lobe 145 and the opening 146 of the linkage 145. A bolt 161 extends through the opening in the fixed lobe 148 and into the opening 146 of the linkage 145. The bolt 161 may function as a tilt axle for mounting plate 150 or disc 149. Preferably, the compression screw 143 is received into a channel or tapped hole formed in the bolt 161 so that the compression screw 143 is moveable relative to the bolt 161. For instance, the channel in the bolt 161 may have threads that mate with threads on the screw 143 such that the screw can move into and out of the channel in the bolt 161.

A user may use a tool 152, such as a hex wrench or screw driver, to rotate the compression screw 143 to tighten or loosen the fit between the moveable lobe 145, linkage 147 and fixed lobe 148 to adjust how difficult or easy it is to tilt the mounting plate 150 or an object directly attached to the mounting plate 150. If engagement between the lobes 145 and 148 and linkage 147 is tightened, then more friction will be created during tiling of the mounting plate 150 about the axis defined by the bolt 161. If the engagement is loosened, the amount of friction created during tiling of the mounting plate 150 will be reduced. Preferably, the disc 149 has one or more openings 171 sized to receive a portion of the moveable lobe 145 and define the distance that the moveable lobe 145 may move relative to the linkage 147 or fixed lobe 148 to define the tightest and loosest positions of the moveable lobe 145.

It should be appreciated that other variations of the present preferred embodiments discussed above may be made. For example, the support post 5 is shown as a generally cylindrical support, but other embodiments may include a post that is generally rectangular, or other support members of other sizes or configurations. As another example, the support post can include multiple threads formed in the post along the length of the post. As an additional example, the clamp may be configured to attach the support post to a cubicle panel, wall, or other substantially vertical surface or to a tilted work surface. As yet another example, the collar may include two or more teeth that project inward and are configured to engage with one or more threads in the support post 5 such that the teeth travel along the one or more threads during movement of the collar. As yet another example, the mounting plate 150 may be configured to comply with the VESA standard or be configured to hold or attach to various other types of monitors, displays or other objects.

While certain present preferred embodiments of the support apparatus and certain embodiments of methods of practicing the same have been shown and described, it is to be distinctly understood that the invention is not limited thereto but may be otherwise variously embodied and practiced within the scope of the following claims.

We claim:

1. A support apparatus for at least one display device comprising:
   a support member having at least one thread;
   a collar attached to the support member, the collar moveable along the at least one thread of the support member such that rotation of the collar in a first direction moves the collar in a substantially upward direction along the support member and rotation of the collar in a second direction that is opposite the first direction moves the collar in a substantially downward direction along the support member;
   at least one arm assembly directly attached to the collar, contacting the collar, or positioned on the collar, movement of the collar in the substantially upward direction along the support member adjusting a vertical position of the at least one arm assembly and movement of the collar in the substantially downward direction along the support member adjusting the vertical position of the at least one arm assembly, the at least one arm assembly sized and configured to hold at least one display device.

2. The support apparatus of claim 1 wherein the at least one arm assembly contacts the collar or is directly attached to the collar and the support member has a first end and a second end opposite the first end and the at least one thread is a groove formed in the support member that extends along a helical path from adjacent to the first end of the support member to adjacent the second end of the support member.

3. The support apparatus of claim 2 wherein the at least one arm assembly is comprised of a first arm assembly and wherein the at least one thread is formed along an outer surface of the support member or is cut into the outer surface of the support member.

4. The support apparatus of claim 2 wherein the at least one arm assembly is comprised of a first arm assembly having a first linkage that is pivotally attached to a second linkage and a third linkage pivotally attached to the second linkage, the third linkage also attached to a mounting plate.

5. The support apparatus of claim 2 further comprising a friction adjustment mechanism attached to the at least one arm assembly.

6. The support apparatus of claim 5 wherein the friction adjustment mechanism is comprised of a plurality of friction inducing members positioned adjacent an axle defining a tilt axis for the at least one object, the friction inducing members sized and configured to apply an amount of friction during movement of the at least one object about the tilt axis.

7. The support apparatus of claim 6 wherein the friction adjustment mechanism is further comprised of a rotatable member positioned adjacent the friction inducing members, the rotatable member configured to rotate in a first direction and a second direction, rotation of the rotatable member in the first direction increasing the amount of friction and rotation in the second direction decreasing the amount of friction.

8. The support apparatus of claim 5 wherein the friction adjustment mechanism is comprised of a linkage positioned between a moveable lobe and a fixed lobe, the fixed lobe attached to a mounting device, the fixed lobe having a first surface that engages a first surface of the linkage and the moveable lobe having a first surface that engages a second surface of the linkage.

9. The support apparatus of claim 8 wherein the friction adjustment mechanism is further comprised of a rotatable member extending through an opening formed in the moveable lobe and an opening formed in the linkage, the rotatable member being moveable relative to at least one of the moveable lobe and the linkage.

10. The support apparatus of claim 9 wherein the rotatable member is a screw.

11. The support apparatus of claim 9 wherein the rotatable member also extends through an opening formed in the fixed lobe and the rotatable member is moveable relative to at least one of the moveable lobe, the fixed lobe and the linkage.

12. The support apparatus of claim 9 wherein the moveable lobe has a generally polygonal or generally cylindrical shaped structure and the fixed lobe has a generally polygonal or generally cylindrical shaped structure.

13. The support apparatus of claim 1 wherein the at least one arm assembly is comprised of a linkage positioned between a moveable lobe and a fixed lobe, the fixed lobe attached to a mounting device, the fixed lobe having a first surface that engages a first surface of the linkage and the moveable lobe having a first surface that engages a second surface of the linkage.

14. The support apparatus of claim 13 wherein the at least one arm assembly is also comprised of a rotatable member extending through an opening formed in the moveable lobe and an opening formed in the linkage such that movement of the rotatable member adjusts an amount of friction created from movement of the moveable lobe relative to the linkage.

15. The support apparatus of claim 14 wherein the rotatable member also extends through an opening formed in the fixed lobe and the rotatable member is moveable relative to at least one of the moveable lobe, the fixed lobe and the linkage.

16. The support apparatus of claim 15 further comprising an axle extending through the opening in the fixed lobe and the opening of the linkage, the axle having an opening sized and configured to receive the rotatable member.

17. The support apparatus of claim 2 wherein the at least one arm assembly is comprised of a mounting device attached to an arm, the arm positioned on the collar, the mounting device having a groove sized and configured to receive a tool.

18. The support apparatus of claim 2 wherein the at least one arm assembly is comprised of a first arm assembly having a first linkage that has a first end and a second end and a second linkage that has a first end and a second end, the first end of the first linkage pivotally attached to the first end of a second linkage, the first linkage having an indented portion sized and configured to receive at least a portion of the second linkage such that the second linkage can be moved to at least one position adjacent the indented portion.

19. The support apparatus of claim 18 wherein the indented portion is sized and configured such that the second linkage is rotatable along an angular range of 0° to 339.

20. The support apparatus of claim 18 wherein the indented portion defines a gap between the indented portion and the first end of the first linkage.

21. The support apparatus of claim 2 wherein the collar is comprised of at least one projection sized and configured to engage the at least one thread.

22. The support apparatus of claim 21 wherein the at least one projection is a thread or a tooth.

23. The support apparatus of claim 21 wherein the at least one thread is a groove formed in the support member and the at least one projection is sized to fit within the groove and slide along the groove.

24. The support apparatus of claim 21 wherein the collar is comprised of a first portion attached to a second portion, the at least one projection extending from the first portion, the first portion composed of metal or elastomeric material and the second portion composed of elastomeric material.

25. The support apparatus of claim 2 wherein the at least one arm assembly does not include any of a coil spring, a gas spring and a cable to maintain a position of the at least one arm assembly.

26. The support apparatus of claim 2 wherein the at least one arm assembly is positioned on the collar as a lone source of attachment of the at least one arm assembly to the collar, the at least one arm assembly comprising a first arm assembly having a plurality of pivotally interconnected links.

* * * * *